(12) United States Patent
Dhuler et al.

(10) Patent No.: US 6,445,842 B1
(45) Date of Patent: Sep. 3, 2002

(54) MICROELECTROMECHANICAL OPTICAL CROSS-CONNECT SWITCHES INCLUDING MECHANICAL ACTUATORS AND METHODS OF OPERATING SAME

(75) Inventors: Vijayakumar Rudrappa Dhuler, Raleigh; Edward A. Hill, Chapel Hill, both of NC (US)

(73) Assignee: JDS Uniphase, Inc. (CA)

( * ) Notice: Subject to any disclaimer, the term of this patent is extended or adjusted under 35 U.S.C. 154(b) by 0 days.

(21) Appl. No.: 09/542,170

(22) Filed: Apr. 5, 2000

(51) Int. Cl.[7] .............................. G02B 6/26; G02B 6/42
(52) U.S. Cl. ........................................... 385/17; 385/18
(58) Field of Search ............................. 385/16, 17, 18, 385/19, 20–22

(56) References Cited

U.S. PATENT DOCUMENTS

| 4,580,873 A | * | 4/1986 | Levinson ..................... 385/17 |
| 5,778,118 A | | 7/1998 | Sridhar ........................ 385/24 |
| 5,841,917 A | * | 11/1998 | Jungerman et al. ........... 385/17 |
| 5,909,078 A | | 6/1999 | Wood et al. .................. 310/307 |
| 5,955,817 A | * | 9/1999 | Dhuler et al. ................ 310/307 |
| 5,960,132 A | * | 9/1999 | Lin .............................. 385/18 |
| 5,960,133 A | | 9/1999 | Tomlinson .................... 385/18 |
| 5,962,949 A | * | 10/1999 | Dhuler et al. ................ 310/307 |
| 5,974,207 A | | 10/1999 | Aksyuk et al. ............... 385/24 |
| 5,994,816 A | | 11/1999 | Dhuler et al. ................ 310/307 |
| 5,995,817 A | | 11/1999 | Lubbe et al. ................. 455/266 |
| 6,023,121 A | | 2/2000 | Dhuler et al. ................ 310/307 |
| 6,144,781 A | * | 11/2000 | Goldstein et al. ............. 385/18 |
| 6,215,222 B1 | * | 4/2001 | Hoen ........................... 310/309 |
| 6,259,835 B1 | * | 7/2001 | Jing ............................. 385/18 |

OTHER PUBLICATIONS www.aremco.com, Washaway Mounting Adhesives and Accessories, Technical Bulletin A9.

* cited by examiner

Primary Examiner—Hemang Sanghavi
Assistant Examiner—Scott Knauss
(74) Attorney, Agent, or Firm—Myers Bigel Sibley & Sajovec, P.A.

(57) ABSTRACT

Microelectromechanical (MEM) Optical Cross-connect (OXC) switches having mechanical actuators are discussed. In particular, the MEM OXC switches can include a plurality of reflectors, wherein each of the plurality of the reflectors is movable to at least one of a respective first reflector position along a respective optical beam path from an associated input of the MEM OXC switch to an associated output thereof and a respective second reflector position outside the optical beam path. A mechanical actuator moves to at least one of a first mechanical actuator position and a second mechanical actuator position. A selector selects ones of the plurality of reflectors to be coupled to the mechanical actuator and at least one of the plurality of reflectors to be decoupled from the mechanical actuator, wherein the mechanical actuator is coupled to the selected ones of the plurality of reflectors in the first actuator position and wherein the mechanical actuator moves the selected ones of the plurality of reflectors from the respective first reflector positions to the respective second reflector positions when the mechanical actuator moves from the first mechanical actuator position to the second mechanical actuator position. Related methods are also discussed.

63 Claims, 12 Drawing Sheets

MICROELECTROMECHANICAL OPTICAL CROSS-CONNECT SWITCHES INCLUDING MECHANICAL ACTUATORS AND METHODS OF OPERATING SAME

FIELD OF THE INVENTION

The present invention relates to the field of microelectromechanical devices, and more particularly, to microelectromechanical optical switches.

BACKGROUND OF THE INVENTION

Microelectromechanical (MEM) technology has been used in a wide range of applications. For example, MEM devices can be used to switch optical energy from the switch inputs to selected switch outputs. MEM optical switches, sometimes referred to as Optical Cross-Connect (OXC) switches can include an N×N array of reflectors to reflect optical energy from any switch input to any switch output. For example, in a 2×2 OXC, a selected reflector of the 2×2 array can be used to reflect the optical energy from any switch input to any switch output. The selected reflector can be located in the array where the column associated with input and the row associated with the output intersect. The selected reflector can be placed in a reflecting position to reflect the optical energy from the input to the selected output. The other reflectors can be placed in a non-reflecting position so as not to impede the propagation of the optical energy from the input to the selected reflector and to the output.

Some conventional MEM OXC switches operate by orienting the reflectors of the array using magnetic fields. In particular, the reflectors therein may be oriented horizontally (in the plane of the substrate on which the reflector is located) in a non-reflecting position and vertically (orthogonal to the substrate) in a reflecting position. Therefore, to switch optical energy from an input of the OXC switch to an output thereof, the, selected reflector can be oriented vertically and the other reflectors are oriented horizontally. Magnetically actuated MEM OXC switches are described further, for example, in U.S. patent application Ser. No. 09/489,264 filed Jan. 21, 2000, entitled "MEMs Optical Cross-Connect Switch", the disclosure of which is hereby incorporated herein by reference in its entirety.

Unfortunately, reflectors in some magnetically actuated MEM OXC switches may occupy a relative large portion of the substrate, thereby reducing the number of reflectors that may be included in the MEM OXC switch. For example, some magnetically actuated MEM OXC switches orient the reflectors in a horizontal position when the reflectors are in a non-reflective position as described above. Accordingly, the substrate may be over-sized to provide adequate space for all of the reflectors to be oriented horizontally on the substrate. Furthermore, magnetically actuated MEM OXC switches may have localized magnetic actuators located under each reflector. The localized magnetic actuators may, therefore, further increase the area of the substrate which may need to be allocated to each reflector. In view of the above, a need continues to exist to further improve MEM optical switches.

SUMMARY OF THE INVENTION

The present invention can allow improved Microelectromechanical (MEM) Optical Cross-Connect (OXC) switches by providing a plurality of reflectors, wherein the each of the plurality of reflectors is movable to at least one of a respective first reflector position along an optical beam path from an input of the MEM OXC switch to an output thereof and a respective second reflector position outside the optical beam path. A mechanical actuator moves to at least one of a first mechanical actuator position and a second mechanical actuator position. A selector selectively couples at least one of the plurality of reflectors to the mechanical actuator, wherein the at least one of the plurality of reflectors moves from the first reflector position to the second reflector position when the mechanical actuator moves from the first mechanical actuator position to the second mechanical actuator position.

The mechanical actuator can allow a MEM OXC having simplified interconnect therein. In particular, the mechanical actuator may reduce the need to include individual actuation control lines in the MEM OXC. For example, in one embodiment, the mechanical actuator can move all reflectors coupled to the mechanical actuator. Accordingly, the need for controlling which reflectors are actuated may be reduced.

In one embodiment, the mechanical actuator moves in a direction that is substantially perpendicular to a substrate on which the reflectors are located. In another embodiment, the mechanical actuator moves in a direction that is substantially parallel to the substrate on which the reflectors are located.

In a further embodiment, the flexible elements each have a first portion attached to the substrate and a second portion, spaced-apart from the first portion, attached to a respective one of the plurality of reflectors. Each of the plurality of flexible elements allows the attached one of the plurality of reflectors to move between the first and second reflector positions. In another embodiment, the flexible elements can include a third portion spaced-apart from the first and second portions and attached to the substrate.

DETAILED DESCRIPTION OF THE PREFERRED EMBODIMENTS

Figure 1:
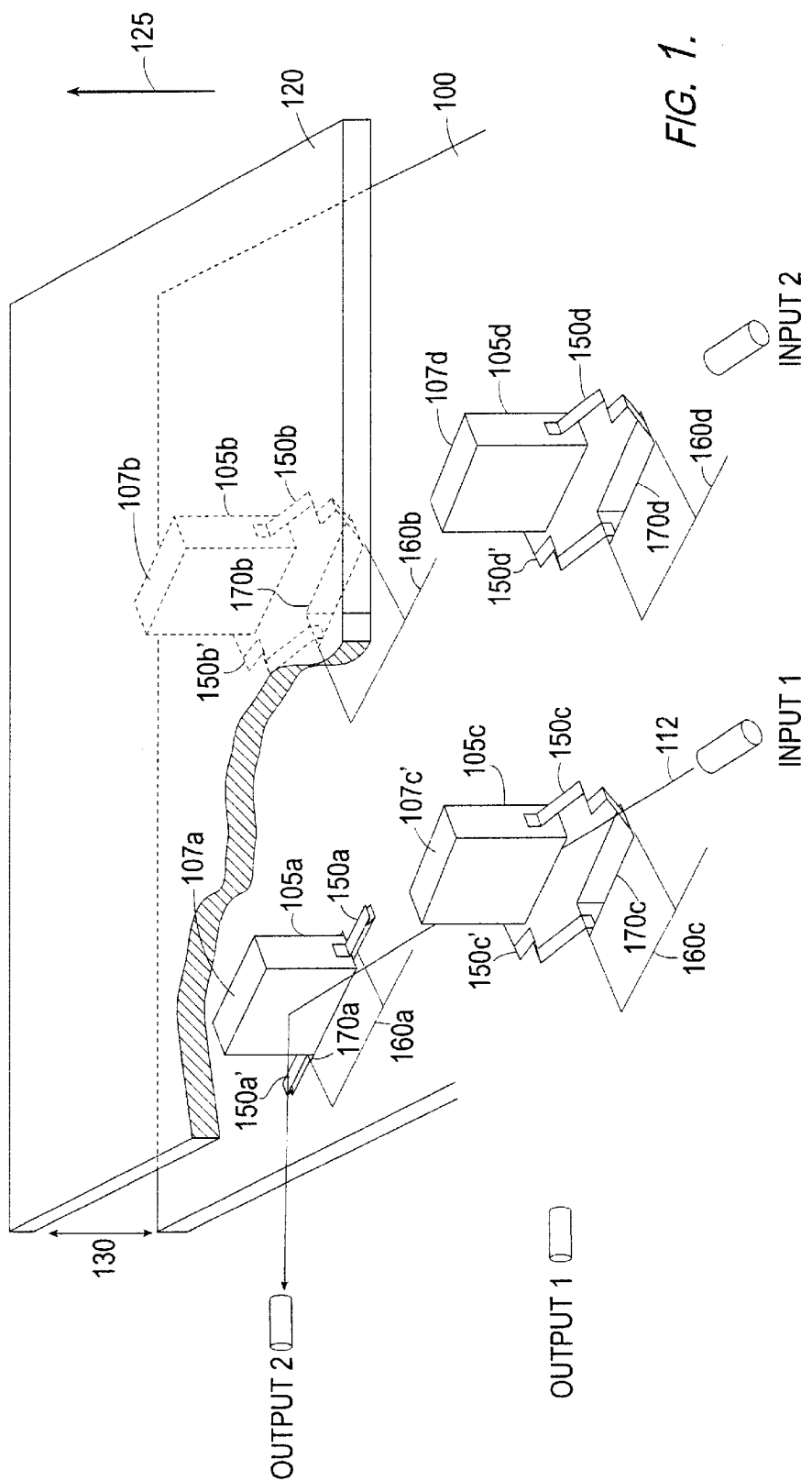
FIG. 1 is a perspective view of an embodiment of a 2×2 Microelectromechanical (MEM) Optical Cross-Connect (OXC) switch according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer. to like elements throughout.

It will be understood that when an element such as a layer, region or substrate is referred to as being "on" another element, it can be directly on the other element or intervening elements may also be present.

FIG. 1 is a perspective view of an embodiment of a 2×2 MEM OXC according to the present invention. The 2×2 MEM OXC switch (the switch) includes four reflectors 105a–d that can be moved from respective reflecting positions to non-reflecting positions by a mechanical actuator 120 that moves from a first to a second mechanical actuator position in a direction 125 that is substantially perpendicular to a substrate 100. The reflecting position can include reflector positions that allow optical energy from an input to reflect to an output. The non-reflecting position can include reflector positions that avoid the reflection of optical energy from an input to an output. The substrate 100 can be silicon or other materials may be used.

In particular, the reflectors 105a–d are organized as an array of 2 columns and 2 rows. Each input is associated with a column in the array. Each output is associated with a row of the array. Optical energy can be reflected from an input to a selected output by positioning a selected reflector 105a–d in the reflecting position and positioning the other reflectors 105a–d in the non-reflecting position. It will be understood that MEM OXC switches having greater or fewer inputs and outputs and/or a different number of inputs and outputs (i.e., an N×M MEM OXC switch) may be provided using arrays of reflectors include more or less than 4 reflectors.

Each of the reflectors 105a–d in a column of the array can be used to reflect optical energy along an optical beam path from the associated input to the associated output. A reflector is selected to reflect optical energy based on the input at which the optical energy is received and the output to which it is to be reflected. For example, as shown in FIG. 1, reflectors 105a,c are associated with the input 1 and reflectors 105a,b are associated with output 2. Therefore, the reflector 105a can be used to switch the optical energy from the input 1 to the output 2 along an optical beam path 112. In operation, the selected reflector 105a–d is placed in the reflecting position and the remaining reflectors are placed in the respective non-reflecting positions. It will be understood that the reflectors can be oriented at an angle relative to the optical beam path defined by the associated input and output. For example, the reflector 105a can be oriented at 45 degrees relative to the optical beam path 112.

The mechanical actuator 120 is spaced a first distance 130 apart from the substrate 100 ,in the first mechanical actuator position so that the mechanical actuator 120 contacts respective upper reflector surfaces 107a–d of the reflectors 105a–d. Alternatively, the mechanical actuator 120 may not contact the upper reflector surfaces 107a–d in the first mechanical actuator position, but may be closely spaced-apart from the upper reflector surfaces 107a–d in the first mechanical actuator position. The mechanical actuator 120 is spaced a second distance, greater than the first distance 130, from the substrate 100 when the mechanical actuator 120 is in the second mechanical actuator position. The mechanical actuator 120 moves from the first to the second mechanical actuator position in the direction 125.

Trenches 170a–d may allow for the associated reflector 105a–d to be moved in a direction opposite to the direction 125 if the mechanical actuator 120 contacts the associated upper reflector surfaces 107a–b. The trenches 170a–d may thereby reduce the likelihood of damage to the reflector 105a–d and/or the substrate 100 if the mechanical actuator 120 contacts the associated upper reflector surfaces 107a–b which may otherwise cause the reflector to contact the substrate 100.

While in the first mechanical actuator position, the reflectors 105a–d to be positioned in the non-reflecting position can be electrostatically coupled to the mechanical actuator 120. The electrostatic coupling can be provided by maintaining a potential difference between the mechanical actuator 120 and each reflector 105a–d to be coupled to the mechanical actuator 120. In one embodiment, the potential difference is provided by a clamping voltage selectively applied to the reflectors 105a–d and a mechanical actuator voltage level applied to the mechanical actuator 120. Accordingly, the conductors 160a–d can provide a selector that selectively couples the reflectors 105a–d to the mechanical actuator 120.

Preferably, the mechanical actuator voltage level is maintained at ground and the clamping voltage level on the conductors can be positive or negative relative to the mechanical actuator voltage level as shown, for example, in FIGS. 2A–2D. Other voltage levels may be used. Alternatively, the mechanical actuator 120 can include conductors that conduct the clamping voltage to areas of the mechanical actuator 120 associated with the underlying respective reflectors 105a–d. For example, the clamping voltage may be applied to selected areas of the mechanical actuator 120 and the reflectors 105a–d can be grounded.

The clamping voltage can be provided to the reflectors 105a–d to be positioned in the non-reflecting position and withheld from the reflector to be positioned in the reflecting position. For example, according to FIG. 1, to reflect optical energy from the input 1 to the output 2, the reflectors 105b–d are provided with the clamping voltage and reflector 105a is not provided with the clamping voltage. Accordingly, the reflectors 105b–d are coupled to the mechanical actuator 120 and the reflector 105a is decoupled from the mechanical actuator 120. The clamping,voltage can be provided from the conductors 160a–d to the selected reflectors 105a–d via flexible elements discussed herein.

In another embodiment according to the present invention, the reflectors 105a–d can be mechanically coupled to the mechanical actuator 120. In particular, the mechanical coupling may be provided by a thermoplastic material. The thermoplastic material can be located on the mechanical actuator 120 opposite the reflectors 105a–d. When a selected reflector 105a–d is to be moved, the thermoplastic material opposite the selected reflector 105a–d is heated and the mechanical actuator 120 is placed in contact with selected reflector 105a–d whereupon the heating stops. When the thermoplastic material is dry, it mechanically couples the selected reflector 105a–d to the mechanical actuator 120. The thermoplastic material can be heated by a heater located on the mechanical actuator 120. The use of thermoplastic material is discussed further, for example, in U.S. patent application Ser. No. 09/543540, entitled Lockable MicroElectroMechanical Actuators Using Thermoplastic Material, and Methods of Operating Same filed Apr. 5, 2000.

When the mechanical actuator 120 is moved in the direction 125, the reflectors 105a–d coupled to the mechanical actuator 120 are moved from the reflecting position to the non-reflecting position. Moreover, the reflector 105a–d that is decoupled from the mechanical actuator 120 remains in the reflecting position when the mechanical actuator 120 moves from the first to the second mechanical actuator position, thereby enabling the optical energy to be reflected from the input to the output along the optical beam path.

The mechanical actuator can be, for example, an inductively driven servo mechanism or a precision stepper-motor that can be used to control the position of a plate attached to the mechanical actuator 120. In operation, the mechanical actuator 120 can move at a rate of about 18 microns per millisecond with an accuracy of 2 microns per inch of movement. Such mechanisms are marketed, for example, by TS Products, Inc. located at 5550-2 North McGuire Rd., Post Falls, Id. 83854, and are described on the Internet at http://www.tsproducts.com.

First and second flexible elements 150a–d, 150a–d are attached to the associated reflectors 105a–d and the substrate 100. The first and second flexible elements 150a–d, 150a–d can allow the associated reflectors 105a–d to move between the reflecting and non-reflecting positions in response to the movement of the mechanical actuator 120. Otherwise, the first and second flexible elements 150a–d, 150a'–d' hold the associated reflectors 105a–d in the respective reflecting position. For example, as shown in FIG. 1, the first and second flexible elements 150b–c, 150b'–c' can extend to allow the coupled reflectors 105b–d to be moved to the non-reflecting position in response to the movement of the mechanical actuator 120.

In another embodiment, only those reflectors 105a–d located in the row and column associated with the input and output are moved. For example, referring to FIG. 1, to switch optical energy from the input 1 to the output 2 along the optical beam path 112, the reflectors 105a–d can remain in the reflecting position and the reflector 105c is moved to the non-reflecting position. The reflectors 105b,d remain in reflecting position. In other words, the selected reflector 105a is placed in the reflecting position and only the reflectors that may otherwise block the optical beam path 112 are, moved to the non-reflecting positions. The other reflectors may remain in the respective reflecting positions.

In another embodiment according to the present invention, the non-reflecting and reflecting positions are reversed from those described above. In particular, the reflectors to be placed in the reflecting position can be clamped to and moved by the mechanical actuator and the reflectors to remain in the non-reflecting position can be unclamped from and unmoved by the mechanical actuator. The inputs, outputs, and the optical beam paths therebetween can also be offset from those described above so that the reflectors that are moved to the reflecting position intersect the offset optical beam paths and the reflectors that remain in the non-reflecting position do not intersect the optical beam path.

FIGS. 2A–D are cross-sectional views illustrating exemplary operations of an embodiment of a 2×2 MEM OXC having a mechanical actuator 220 that moves substantially, perpendicular to the substrate 100. It will be understood that the elements shown in FIGS. 2A–D are shown schematically and that reflectors 205a–b can be occluded by the reflectors 205c–d.

Figure 2A:
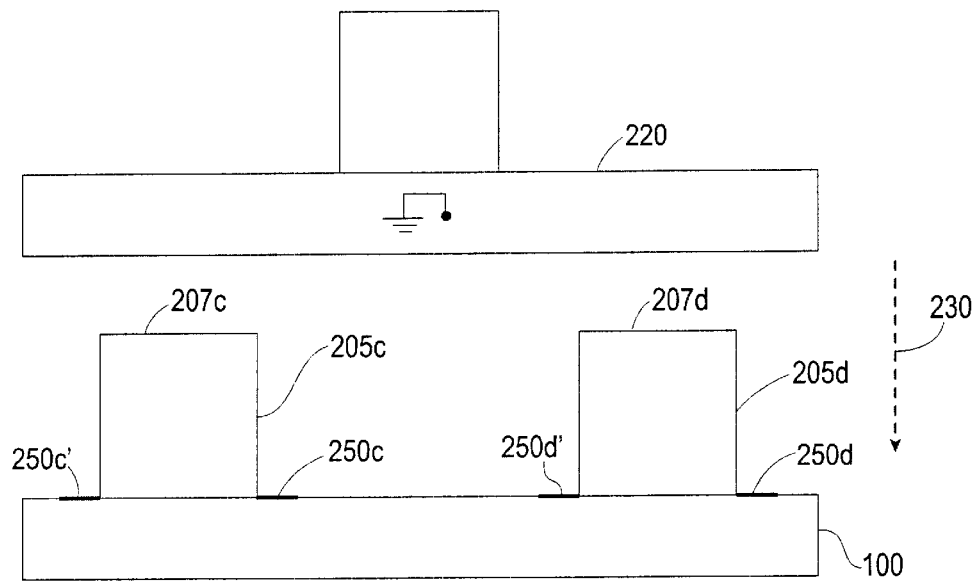
FIGS. 2A–2D are schematic cross-sectional views of an embodiment of a 2×2 MEM OXC switch according to the present invention that illustrate operations thereof.
Figure 2B:
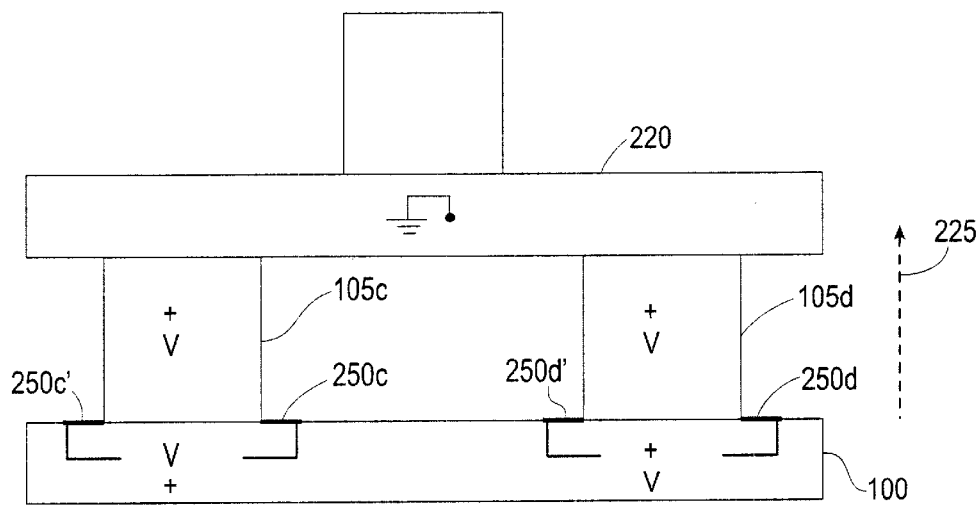

According to FIG. 2A, the mechanical actuator 220 moves from the second mechanical actuator position in a first direction 230, substantially perpendicular to the substrate 100, towards the reflectors 205a–d in the respective reflecting positions. In FIG. 2B, the mechanical actuator 220 contacts the upper reflector surfaces 207a–d whereupon the clamping voltage is applied to the reflectors 205b–d thereby electrostatically clamping the reflectors 205b–d to the mechanical actuator 220. The clamping voltage is not applied to the selected reflector 205a. Accordingly, the selected reflector 205a is decoupled from the mechanical actuator 220. Alternatively, the mechanical actuator 220 can include conductors that conduct the clamping voltage to areas of the mechanical actuator 220 adjacent to the underlying respective reflectors. For example, the clamping voltage may be applied to the areas of the mechanical actuator 220 while the reflectors 205b–d are grounded.

Figure 2C:
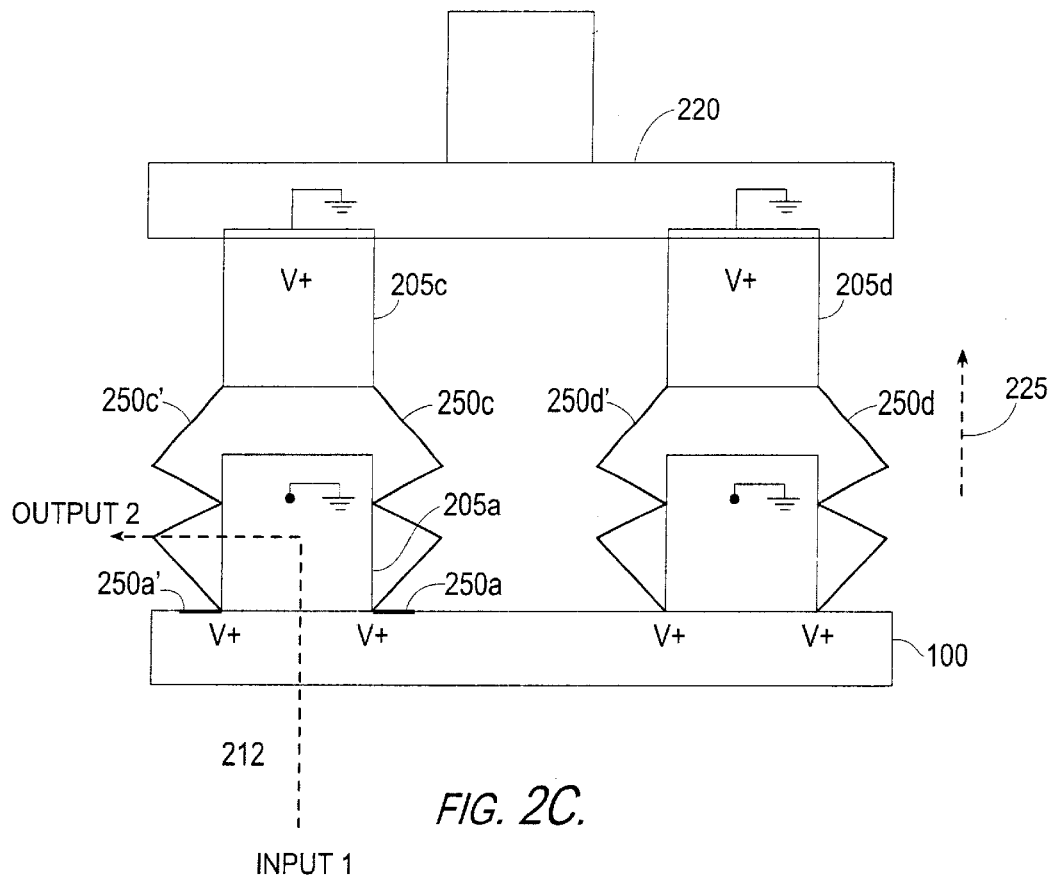
Figure 2D:
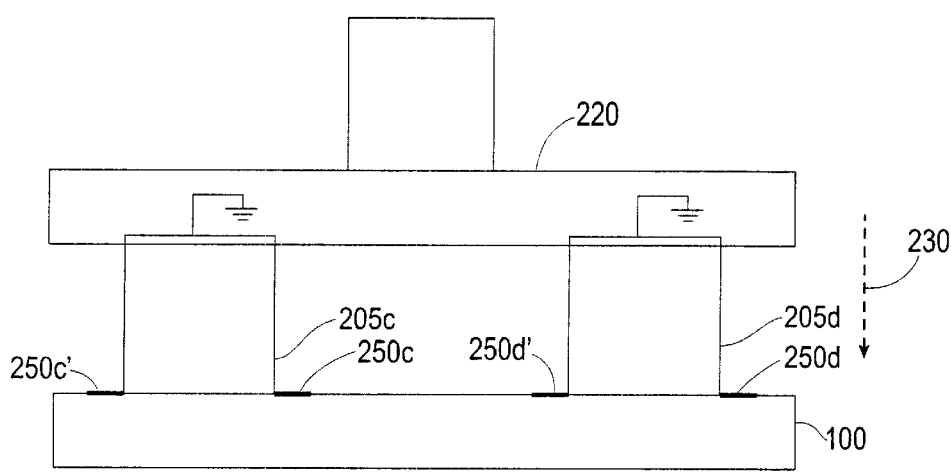

According to FIG. 2C, the mechanical actuator 220 is moved in a second direction 225 to the second mechanical actuator position which moves the coupled reflectors 205b–d to the respective non-reflecting positions. The selected reflector 205a remains in the reflecting position. First and second flexible elements 250b–d, 250b'–d' extend as shown (remaining outside the optical beam path 212 from the input to the output) to allow the coupled reflectors 205b–d to move. According to FIG. 2D, the mechanical actuator 220 moves back to the first mechanical actuator position, whereupon a new arrangement of coupling and decoupling may be provided.

Figure 3:
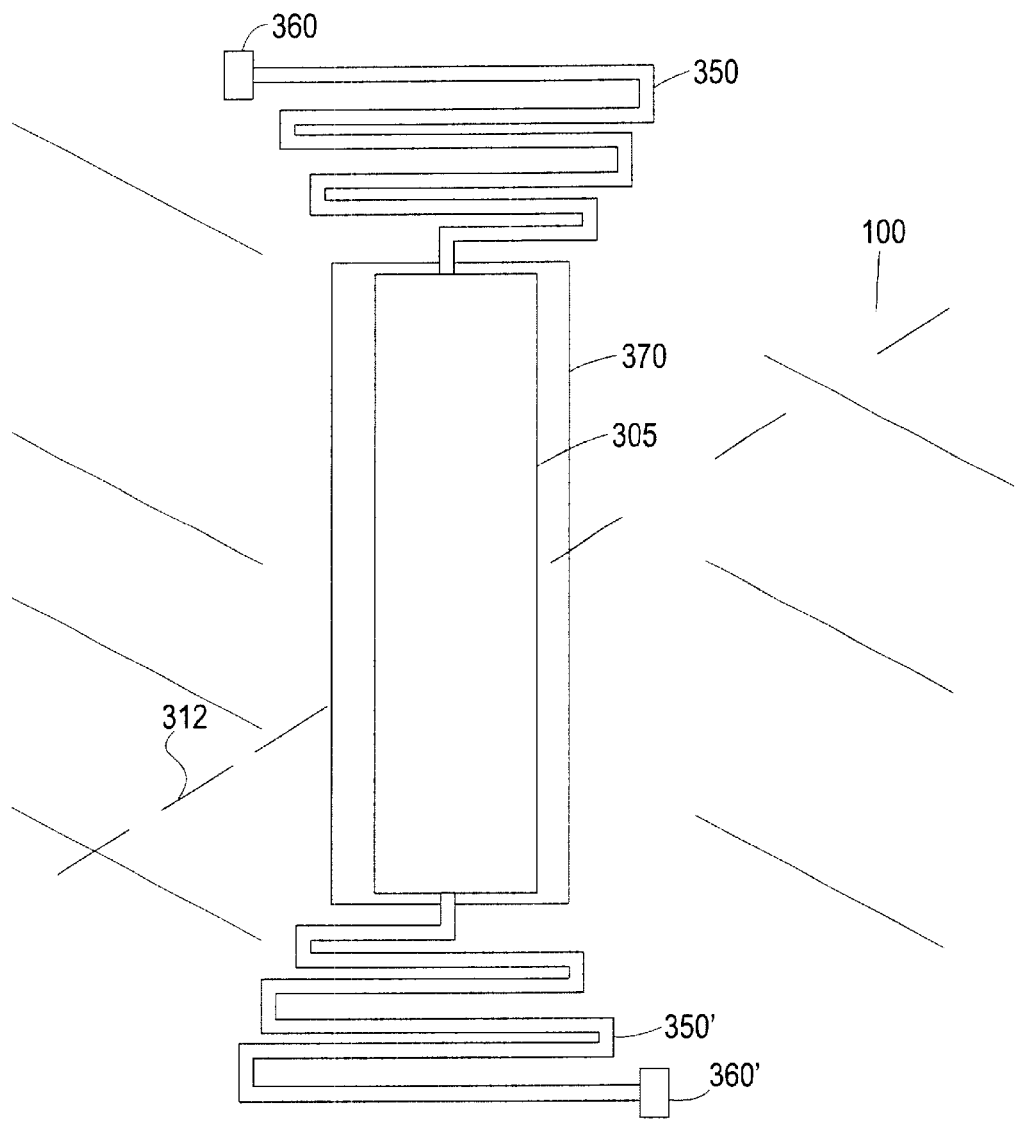
FIG. 3 is a plan view of an embodiment of a reflector having associated flexible elements according to the present invention.

FIG. 3 is a plan view of an embodiment of a reflector 305 on a trench 370 in a substrate 100 having associated first and second flexible elements 350, 350'. As shown in FIG. 3, the first and second flexible elements 350, 350' can have a u shaped zig-zag pattern. Other patterns may be used. For example, the flexible elements can have be w shaped zig-zag pattern or a closed rectangular shape. The first and second flexible elements 350, 350' are attached to the substrate 100 via first and second anchors 360, 360' respectively and to the reflector 305. When the reflector 305 is moved to the non-reflecting position, the first and second flexible elements 350, 350' extend and remain outside an optical beam path 312.

Figure 4:
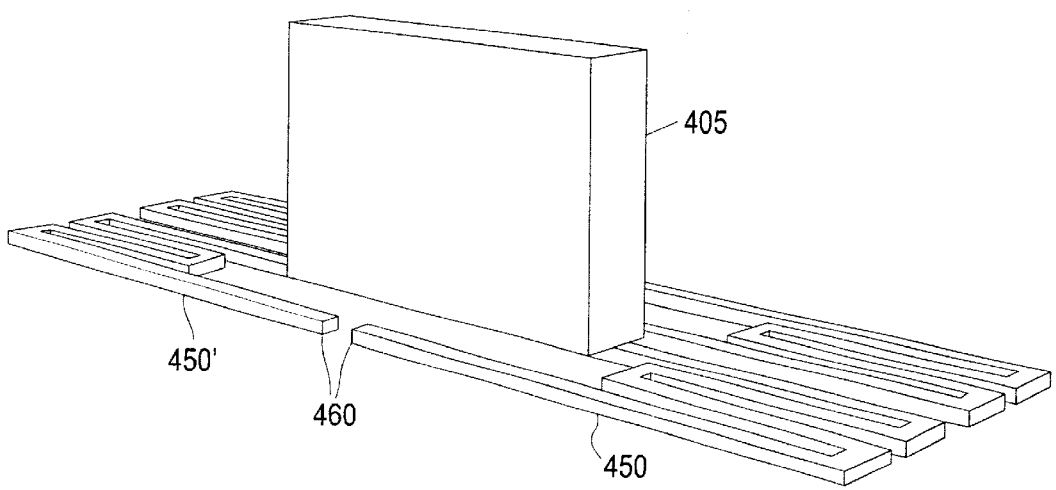
FIG. 4 is a perspective view of another embodiment of a reflector having associated flexible elements according to the present invention.
Figure 5:
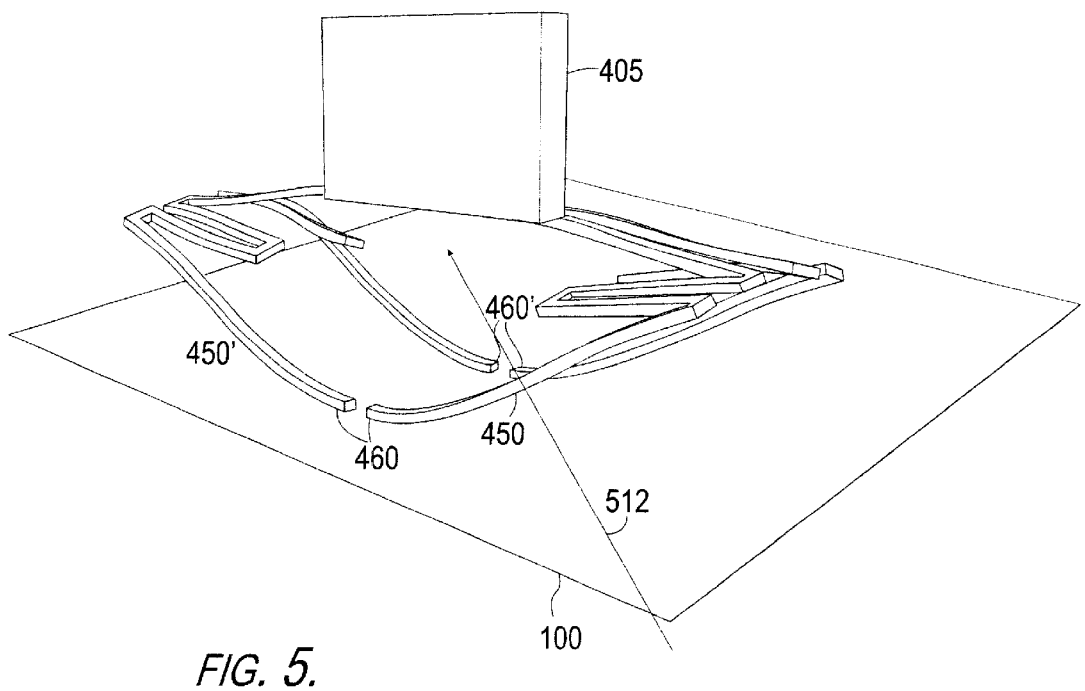
FIG. 5 is a perspective view of the reflector of FIG. 4 in a non-reflecting position according to the present invention.

FIG. 4 is a perspective view of an embodiment of a reflector 405 on a substrate 100 having associated first and second flexible elements 450, 450'. According to FIG. 4, the first and second flexible elements 450, 450' can have a u shaped zig-zag pattern. Other patterns may be used. For example, the first and second flexible elements 450, 450' are attached to the substrate 100 via first and second anchors 460, 460' and to the reflector 405. The first and second anchors 460, 460' are located on the substrate 100 adjacent to a reflective surface of the reflector 405. When the reflector 405 is moved to the non-reflecting position, the first and second flexible elements 460, 460' extend and remain outside an optical beam path 512 as shown in FIG. 5.

Figure 6:
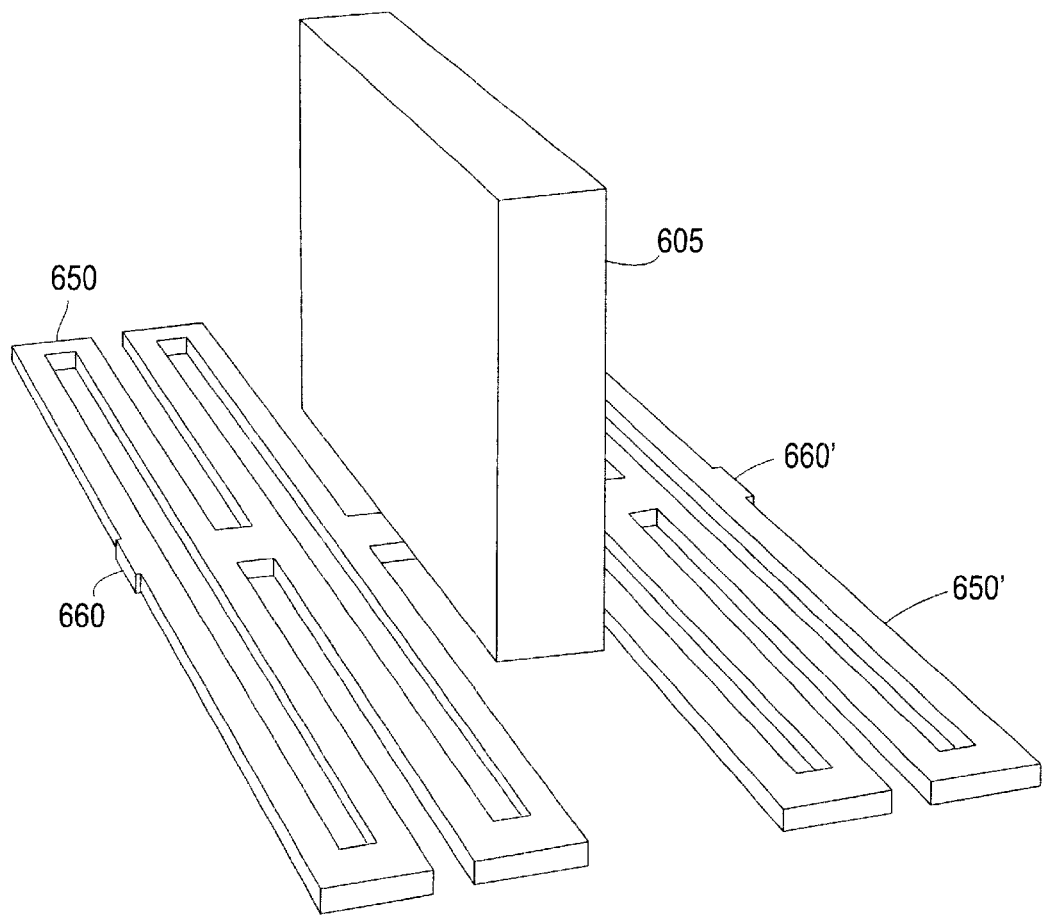
FIG. 6 is a perspective view of another embodiment of a reflector having associated flexible elements according to the present invention.
Figure 7:
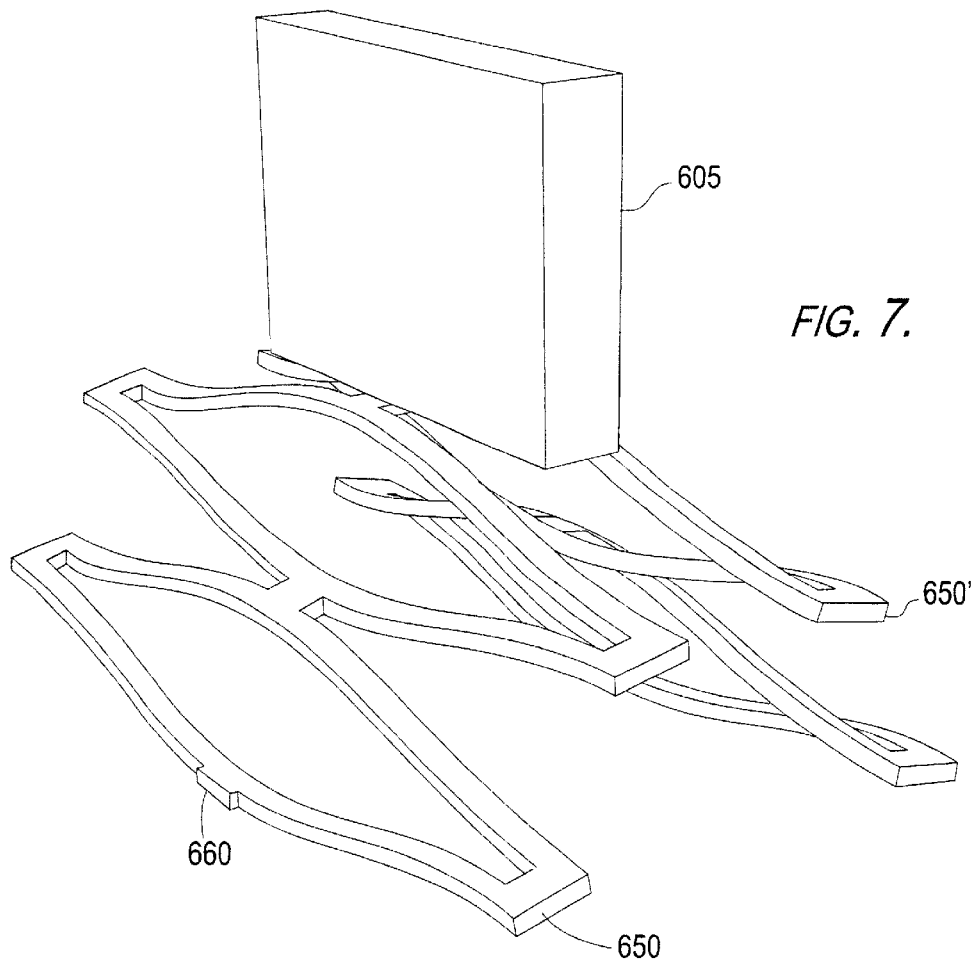
FIG. 7 is a perspective view of the reflector of FIG. 6 in a non-reflecting position according to the present invention.

FIG. 6 is a perspective view of an embodiment of a reflector 605 on a substrate 100 having associated first and second flexible elements 650, 650'. According to, FIG. 6, the first and second flexible elements 650, 650' can have a closed rectangular pattern. Other patterns can be used. For example, the first and second flexible elements 650, 650' are attached to the substrate 100 via first and second anchors 660, 660' and to the reflector 605. The first and second anchors 660, 660' can be located on the substrate 100 adjacent to a reflective surface of the reflector 605 and a non-reflective surface opposite the reflective surface. When the reflector 605 is moved to the non-reflecting position, the first and second flexible elements 650, 650' extend as shown in FIG. 7.

Figure 8:
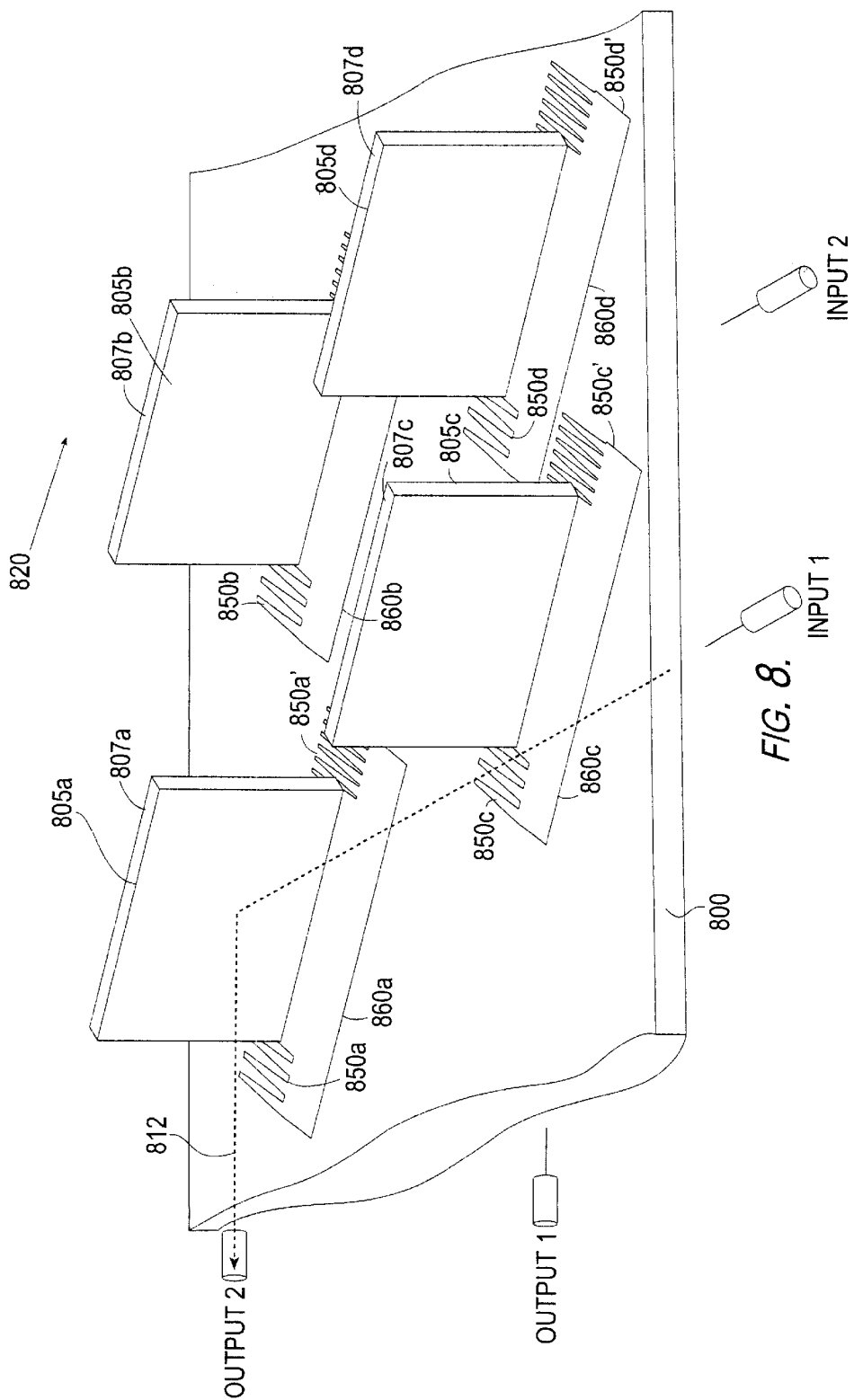
FIG. 8 is a perspective view of another embodiment of a 2×2 MEM OXC switch according to the present invention.

FIG. 8 is a perspective view illustrating another embodiment of a 2×2 MEM OXC switch according to the present invention. The 2×2 MEM OXC switch (the switch) includes four reflectors 805a–d that can be moved from respective reflecting to non-reflecting positions by a mechanical actuator (not shown) that moves substantially parallel to a substrate 800 from a first to a second mechanical actuator position. The reflecting position can include reflector positions that allow optical energy from an input to reflect to an output. The non-reflecting position can include reflector positions that avoid the reflection of optical energy from an input to an output. The substrate 800 can be silicon or other materials may be used.

In particular, the reflectors 805a–d are organized as an array of 2 columns and 2 rows. Each input is associated with a column in the array. Each output is associated with a row of the array. Optical energy can be reflected from an input to a selected output by positioning a selected reflector 805a–d in the reflecting position and positioning the other reflectors 805a–d in the non-reflecting position. It will be understood that MEM OXC switches having greater or fewer inputs and outputs and/or a different number of inputs and outputs (i.e., an N×M MEM OXC switch) may be provided using arrays of reflectors include more or less than 4 reflectors.

Each of the reflectors 805a–d in a column of the array can be used to reflect optical energy along an optical beam path from the associated input to the output associated with the row. A reflector 805a–d is selected to reflect optical energy based on the input at which the optical energy is received and the output to which it is to be reflected. For example, as shown in FIG. 8, reflectors 805a,c are associated with the input 1 and reflectors 105a,b are associated with output 2. Therefore, reflector 805a can be used to switch the optical energy from the input 1 to the output 2 along an optical beam path 812.

In operation, the selected reflector 805a–d is placed in the reflecting position and the remaining reflectors are placed in the respective non-reflecting positions. It will be understood that the reflectors can be oriented at an angle relative to the optical beam path defined by the associated input and output. For example, the reflector 805a can be oriented at 45 degrees relative to the optical beam path 812.

The mechanical actuator contacts respective upper reflector surfaces 807a–d of the reflectors, 805a–d when the mechanical actuator is in the first mechanical actuator position. Alternatively, the mechanical actuator may not contact the upper reflector surfaces 807a–d in the first mechanical actuator position, but may be closely spaced-apart from the upper reflector surfaces 807a–d. In the second mechanical actuator position, the mechanical actuator is shifted in a direction 870 substantially parallel to the substrate 800 while remaining in contact with the upper reflector surfaces 807a–d.

In the first mechanical actuator position, the reflectors 805a–d to be positioned in the non-reflecting position can be electrostatically coupled to the mechanical actuator. The electrostatic coupling can be provided by maintaining a potential difference between the mechanical actuator and each reflector 805a–d to be positioned in the non-reflecting position. A clamping voltage level can be provided to each of the reflectors 805a–d by respective conductors 860a–d. Preferably, the mechanical actuator voltage level is maintained at ground and the clamping voltage level is positive or negative relative to the mechanical actuator level. Other voltage levels may be used.

The clamping voltage level can be provided to the reflectors 805a–d to be positioned ink the reflecting position and withheld from the reflector 805a–d to be positioned in the reflecting position. For example, according to FIG. 8, to reflect optical energy from the input 1 to the output 2, the reflectors 805b–d can be provided with the clamping voltage and reflector 805a is not provided with the clamping voltage. Accordingly, the reflectors 805b–d are coupled to the mechanical actuator and the reflector 805a is decoupled from the mechanical actuator.

When the mechanical actuator is moved in the direction 870 to the second mechanical actuator position, the coupled reflectors 805a–d coupled to the mechanical actuator are shifted, substantially parallel to the substrate 800, from the respective reflecting positions to the non-reflecting positions. Moreover, the reflector 805a–d that is decoupled from the mechanical actuator remains in the reflecting position when the mechanical actuator moves from the first to the second mechanical actuator position, thereby moving the reflector 805c outside the optical beam path 812 and enabling the optical energy to be reflected from the input 1 to the output 2.

In another embodiment, the movement of the mechanical actuator in the direction 870 is used to rotate the reflectors 805a–d from a reflecting position perpendicular to the substrate 800 to a non-reflecting position parallel to the substrate 800. The reflectors 805a–d that are to remain in the non-reflecting position can be electrostatically clamped in the non-reflecting position by the clamping voltage and the selected reflector is not clamped in the non-reflecting position. Accordingly, the selected reflector is positioned in the reflecting position and the other reflectors are moved to the non-reflecting positions.

First and second flexible elements 850a–b, 850a'–b' are attached to the associated reflectors 805a–d and the substrate 800. The first and second flexible elements 850a–d, 850a'–d' allow the associated reflectors 805a–d to move between the reflecting and non-reflecting positions in response to the movement of the mechanical actuator. Otherwise, the first and second flexible elements 850a–d, 850a'–d' can hold the associated reflectors 805a–d in the respective reflecting positions. For example, as shown in FIG. 8, the first and second flexible elements 850b–c, 850b'–c' allow reflectors 805b–d to be shifted, substantially parallel to the substrate 800, to the non-reflecting position by the mechanical actuator.

Figure 9A:
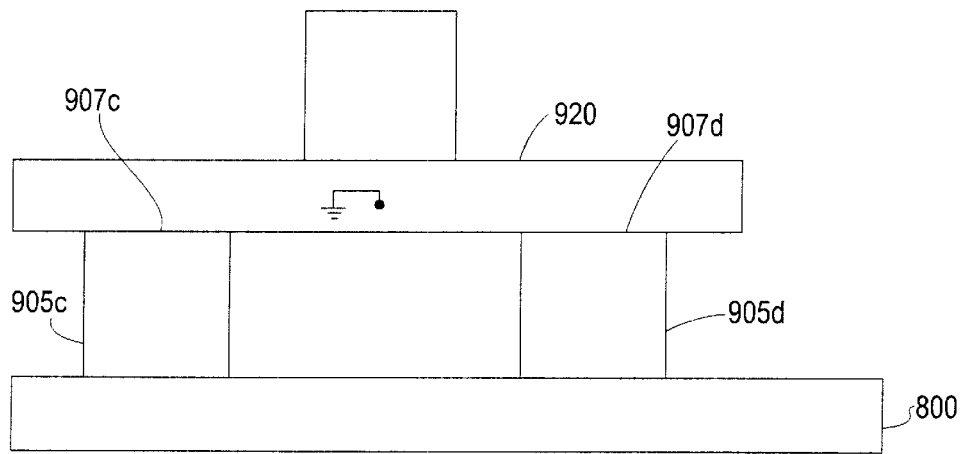
FIGS. 9A–9B are schematic cross-sectional views of another embodiment of a 2×2 MEM OXC switch according to the present invention that illustrate operations thereof.
Figure 9B:
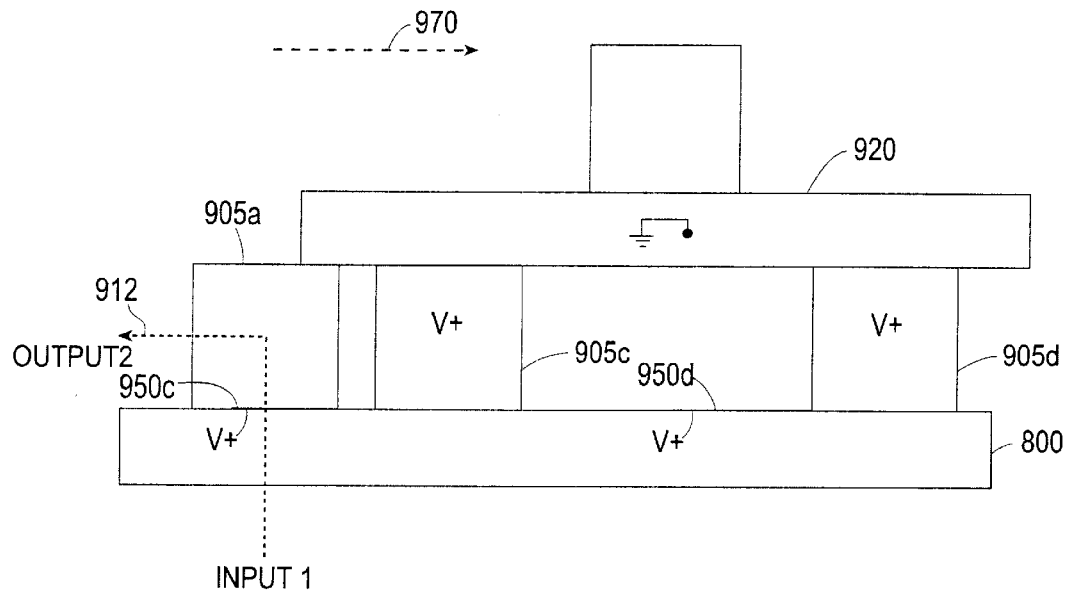

FIGS. 9A–B are cross-sectional views illustrating exemplary operations of an embodiment of a 2×2 MEM OXC having a mechanical actuator 920 that moves substantially parallel to the substrate 800. In the cross-sectional views of FIGS. 9A–D, it will be understood that reflectors 905a–b can be occluded by reflectors 905c–d. According to FIG. 9A, the mechanical actuator 920 is in the first mechanical actuator position and. the reflectors 905a–d are in the respective reflecting positions. The clamping voltage is applied to the reflectors 905b–d thereby coupling the reflectors 905b–d to the mechanical actuator 920. The clamping voltage is not applied to the reflector 905a, thereby decoupling the reflector 905a from the mechanical actuator 920. Alternatively, the mechanical actuator can include conductors that conduct the clamping voltage to areas of the mechanical actuator adjacent to the underlying respective reflectors. For example, the clamping voltage may be applied to the areas of the mechanical actuator while the reflectors 905b–d are grounded.

According to FIG. 9B, the mechanical actuator 920 shifts from the first to the second mechanical actuator position in a direction 970 substantially parallel to the substrate 800.

When the mechanical actuator 920 shifts from the first to the second mechanical actuator position, the coupled reflectors 905b–d are shifted to the respective non-reflecting positions.

Figure 10:
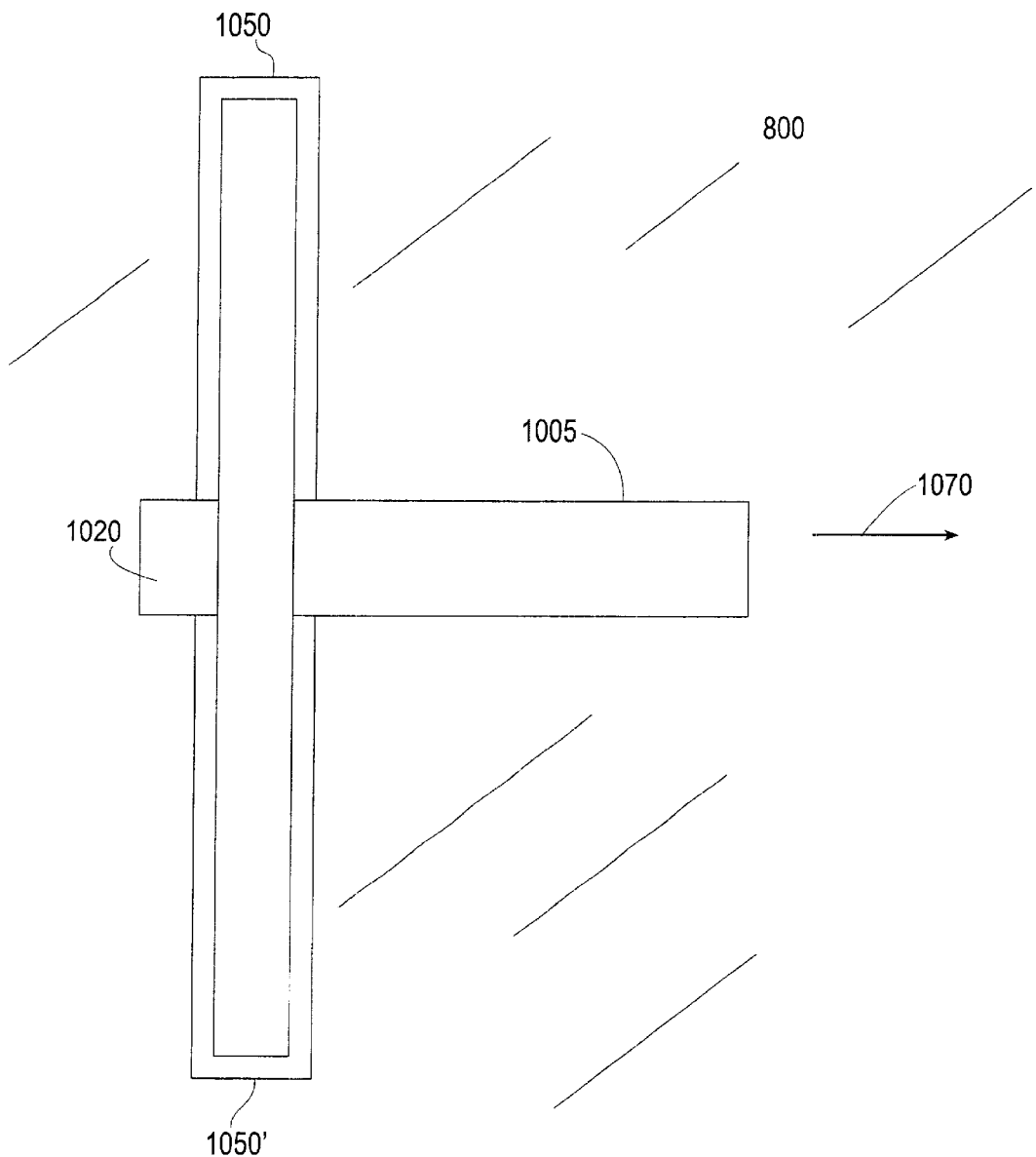
FIG. 10 is a plan view of an embodiment of a flexible element according to the present invention.

FIG. 10 is a plan view of an embodiment of a reflector 1005 and attached first and second opposed flexible elements 1050, 1050' on a substrate 800. The first and second opposed flexible elements 1050, 1050 can allow the reflector 1005 to move in a direction 1070 substantially parallel to the substrate 800 between first and second mechanical actuator positions. The first and second opposed flexible elements 1050, 1050' are attached to the substrate 800 by an anchor 1020. The first and second opposed flexible elements 1050, 1050' extend when the mechanical actuator moves the reflector 1005 from the first to the second reflector position.

Figure 11:
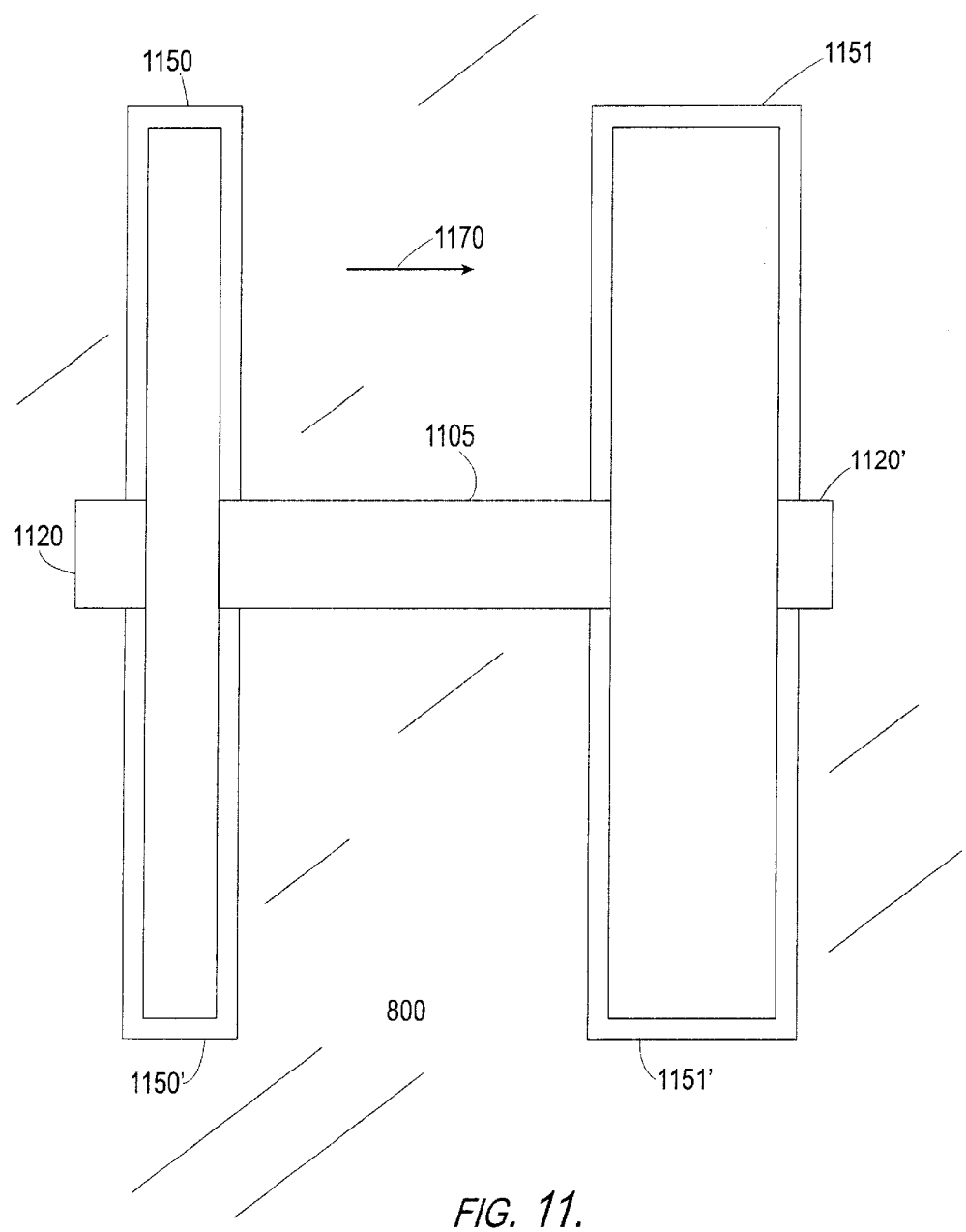
FIG. 11 is a plan view of another embodiment of a flexible element according to the present invention.

FIG. 11 is a plan view of an embodiment of a reflector 1105 and first and second pairs of opposed flexible elements 1150, 1150' and 1151, 1151' on the substrate 800. The first and second pairs of opposed flexible elements 1150, 1150' and 1151, 1151' allow the reflector 1105 to move in a direction 1170 substantially parallel to the substrate 800 between first and second mechanical actuator positions. The first and second pairs of opposed flexible elements 1150, 1150' and 1151, 1151' are attached to the substrate 800 by respective anchors 1120, 1120'. When the mechanical actuator moves the reflector 1105 from the first to the second reflector position, the first and second pairs of opposed flexible elements 1150, 1150' move to allow the reflector 1105 to move in the direction 1170. In particular, the first pair of flexible opposed elements 1150, 1150' extends in the direction 1170 and the second pair of flexible opposed elements 1151, 1151' contracts in direction 1170.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed:

1. A microelectromechanical optical cross-connect switch that switches optical energy from an input of the microelectromechanical optical cross-connect switch to an output of the microelectromechanical optical cross-connect switch, the microelectromechanical optical cross-connect switch comprising:

a substrate a plurality of reflectors, on the substrate, wherein the each of the plurality of reflectors is movable to at least one of a respective first reflector position along an optical beam path from an input of the microelectromechanical optical cross-connect switch to an output thereof and a respective second reflector position outside the optical beam path;

a mechanical actuator that is movable to at least one of a first mechanical actuator position and a second mechanical actuator position; and a selector that selectively couples at least one of the plurality of reflectors to the mechanical actuator such that the at least one of the plurality of reflectors moves from the first reflector position to the second reflector position when the mechanical actuator moves from the first mechanical actuator position to the second mechanical actuator position.

2. A microelectromechanical optical cross-connect switch according to claim 1, wherein the selector selectively decouples at least a second one of the plurality of reflectors from the mechanical actuator so that the at least second one of the plurality of reflectors remains in the first reflector position when the mechanical actuator moves from the first mechanical actuator position to the second mechanical actuator position.

3. A microelectromechanical optical cross-connect switch according to claim 1, wherein the mechanical actuator moves from the first to the second mechanical actuator position in a direction of mechanical actuator movement that is substantially perpendicular to the substrate.

4. A microelectromechanical optical cross-connect switch according to claim 1, wherein the first and second mechanical actuator positions define a plane that is substantially parallel to the substrate.

5. A microelectromechanical optical cross-connect switch according to claim 1 further comprising:

a plurality of flexible elements, on the substrate, a respective one of the plurality of flexible elements having a first portion attached to the substrate and a second portion, spaced-apart from the first portion, attached to a respective one of the plurality of reflectors, wherein the respective one of the plurality of flexible elements allows the attached respective one of the plurality of reflectors to move between the first and second reflector positions.

6. A microelectromechanical optical cross-connect switch according to claim 5, wherein the respective one of the plurality of flexible elements includes a third portion spaced-apart from the first and second portions and attached to the substrate.

7. A microelectromechanical optical cross-connect switch according to claim 1 further comprising:

a first flexible element attached to a respective one of the plurality of reflectors and the substrate, wherein the respective one of the plurality of reflectors is coupled to the mechanical actuator and moves when the mechanical actuator moves from the first mechanical actuator, position to the second mechanical actuator position; and a second flexible element attached to a respective second one of the plurality of reflectors and the substrate, wherein the respective second one of the plurality reflectors is decoupled from the, mechanical actuator and does not move when the mechanical actuator moves from the first mechanical actuator position to the second mechanical actuator position.

8. A microelectromechanical optical cross-connect switch according to claim 7, wherein the first flexible element remains outside the optical beam path when the respective one of the plurality of reflectors is moved to the second reflector position.

9. A microelectromechanical optical cross-connect switch according to claim 7, wherein the first flexible element remains substantially outside the optical beam path when the respective one of the plurality of reflectors is moved to the second reflector position.

10. A microelectromechanical optical cross-connect switch according to claim 7, wherein the first flexible element includes a first portion attached to the substrate and a second portion, spaced-apart from the first portion, attached to the respective one of the plurality of reflectors, further comprising:

a third flexible element, on the substrate, spaced-apart from the first flexible element, the third flexible element having a first portion attached to the substrate and a second portion, spaced-apart from the first portion, attached to the respective one of the plurality of reflectors, wherein the third flexible element moves when the mechanical actuator moves from the first mechanical actuator position to the second mechanical actuator position.

11. A microelectromechanical optical cross-connect switch according to claim 10, wherein the third flexible element is located substantially outside the optical beam path when the respective one of the plurality of reflectors is moved to the second reflector position.

12. A microelectromechanical optical cross-connect switch according to claim 7, wherein at least one of the first and second flexible elements comprises a u-shaped zig-zag pattern.

13. A microelectromechanical optical cross-connect switch according to claim 7, wherein at least one of the first and second flexible elements comprises a closed rectangular pattern.

14. A microelectromechanical optical cross-connect switch according to claim 7, wherein at least one of the first and second flexible elements extends in a direction substantially perpendicular to the substrate when the mechanical actuator moves from the first to the second mechanical actuator position.

15. A microelectromechanical optical cross-connect switch according to claim 7, wherein at least one of the first and second plurality of flexible elements extends in a direction substantially parallel to the substrate when the mechanical actuator moves from the first to the second mechanical actuator position.

16. A microelectromechanical optical cross-connect switch according to claim 1, further comprising:
a plurality of trenches in the substrate adjacent the plurality of reflectors.

17. A microelectromechanical optical cross-connect switch according to claim 5, further comprising:
a plurality of trenches in the substrate opposite the plurality of reflectors, wherein each of the plurality of flexible elements extends opposite the associated one of the plurality of trenches from the substrate to the associated one of plurality of reflectors.

18. A microelectromechanical optical cross-connect switch according to claim 1, wherein the mechanical actuator comprises a conductive plate that is moved between the first and second mechanical actuator positions via at least one of an inductively driven servo and a stepper motor.

19. A microelectromechanical optical cross-connect switch according to claim 1, wherein the selector comprises a plurality of conductors that conduct a voltage level to the selected ones of the plurality of reflectors to couple the selected ones of the plurality of reflectors to the mechanical actuator.

20. A microelectromechanical optical cross-connect switch that switches optical energy from an input of the microelectromechanical optical cross-connect switch to an output of the microelectromechanical optical cross-connect switch, the microelectromechanical optical cross-connect switch comprising:
a substrate;
a reflector, on the substrate, wherein the reflector is movable to at least one of a first reflector position along an optical beam path from an associated input of the microelectromechanical optical cross-connect switch to an associated output thereof and a second reflector position outside the optical beam path;
a mechanical actuator that is movable to at least one of a first mechanical actuator position and a second mechanical actuator position; and a selector that selects a reflector to be coupled to the mechanical actuator, wherein a selected reflector is coupled to the mechanical actuator in the first mechanical actuator position so that the mechanical actuator moves the reflector from the first reflector position to the second position when the mechanical actuator moves from the first mechanical actuator position to the second mechanical actuator position.

21. A microelectromechanical optical cross-connect switch according to claim 20, wherein the selector selects a reflector to be decoupled from the mechanical actuator and remain in the first reflector position when the mechanical actuator moves from the first mechanical actuator position to the second mechanical actuator position.

22. A microelectromechanical optical cross-connect switch according to claim 20, wherein the mechanical actuator moves from the first to the second mechanical actuator position in a direction of mechanical actuator movement that is substantially perpendicular to the substrate.

23. A microelectromechanical optical cross-connect switch according to claim 20, wherein the first and second mechanical actuator positions define a plane that is substantially parallel to the substrate.

24. A microelectromechanical optical cross-connect switch according to claim 20 further comprising:
a flexible element, on the substrate, the flexible element having a first portion attached to the substrate and a second portion, spaced-apart from the first portion, attached to the reflector, wherein the flexible element allows the reflector to move between the first and second reflector positions.

25. A microelectromechanical optical cross-connect switch according to claim 24, wherein the flexible element includes a third portion spaced-apart from the first and second portions and attached to the substrate.

26. A microelectromechanical optical cross-connect switch according to claim 20 further comprising:
a second flexible element, on the substrate, the second flexible element having a respective first portion attached to the substrate and a respective second portion, spaced-apart from the first portion, attached to the reflector, wherein the second flexible element extends when the mechanical actuator moves from the first mechanical actuator position to the second mechanical actuator position.

27. A microelectromechanical optical cross-connect switch according to claim 26, wherein the first and second flexible elements are located outside the optical beam path when the reflector is in the second reflector position.

28. A microelectromechanical optical cross-connect switch according to claim 26, wherein at least one of the first and second flexible elements comprises a u-shaped zig-zag flexible element.

29. A microelectromechanical optical cross-connect switch according to claim 26, wherein at least one of the first and second flexible elements comprises a closed rectangular shape.

30. A microelectromechanical optical cross-connect switch according to claim 26, wherein at least one. of the first and second flexible elements extends in a direction substantially perpendicular to the substrate when the mechanical actuator moves from the first to the second mechanical actuator position.

31. A microelectromechanical optical cross-connect switch according to claim 26, wherein at least one of the first and second flexible elements extends in a direction substantially parallel to the substrate when the mechanical actuator moves from the first to the second mechanical actuator position.

32. A microelectromechanical optical cross-connect switch according to claim 20, further comprising:
a trench in the substrate adjacent the reflector, wherein a trench width and length are greater than a reflector width and length.

33. A microelectromechanical optical cross-connect switch according to claim 20, wherein the mechanical actuator comprises a conductive plate that is moved between the first and second mechanical actuator positions via at least one of an inductively driven servo and a stepper motor least.

34. A microelectromechanical optical cross-connect switch that switches optical energy from an input of the microelectromechanical optical cross-connect switch to an output of the microelectromechanical optical cross-connect switch, the microelectromechanical optical cross-connect switch comprising:
a substrate;
a plurality of reflectors, on the substrate, wherein at least one of the plurality of reflectors is movable to at least one of a first reflector position along an optical beam path from an associated input of the microelectromechanical optical cross-connect switch to an associated output thereof and a second reflector position outside the optical beam path;
a mechanical actuator that moves selected ones of the plurality of reflectors from respective first reflector positions to respective second reflector positions; and
a selector that selects ones of the plurality of reflectors to remain in the second reflector position when the mechanical actuator moves from the second mechanical actuator position to the first mechanical actuator position.

35. A microelectromechanical optical cross-connect switch according to claim 34, wherein the selector comprises a plurality of conductors electrically coupled to the plurality of reflectors, wherein the selected ones of the plurality of conductors conduct a clamping voltage level to the selected ones of the plurality of reflectors to maintain the selected ones of the plurality of reflectors in the respective second reflector positions when the mechanical actuator moves from the second mechanical actuator position to the first mechanical actuator position.

36. A microelectromechanical optical cross-connect switch that switches optical energy from an input of the microelectromechanical optical cross-connect switch to an output of the microelectromechanical optical cross-connect switch, the microelectromechanical optical cross-connect switch comprising:
a substrate;
a plurality of reflectors, on the substrate, wherein at least one of the plurality of reflectors is movable to at least one of a first reflector position along an optical beam path from an associated input of the microelectromechanical optical cross-connect switch to an associated output thereof and a second reflector position outside the optical beam path;
a mechanical actuator that moves selected ones of the plurality of reflectors from respective first reflector positions to respective second reflector positions; and
a selector that selects ones of the plurality of reflectors to be coupled to the mechanical actuator and at least one of the plurality of reflectors to be decoupled from the mechanical actuator, wherein the mechanical actuator is coupled to the selected ones of the plurality of reflectors in the first actuator position and wherein the mechanical actuator moves the selected ones of the plurality of reflectors from the respective first reflector positions to the respective second reflector positions when the mechanical actuator moves from the first mechanical actuator position to the second mechanical actuator position.

37. A microelectromechanical optical cross-connect switch according to claim 36, wherein the selected at least one of the plurality of reflectors remains in the first reflector position when the mechanical actuator moves from the first mechanical actuator position to the second mechanical actuator position.

38. A microelectromechanical optical cross-connect switch according to claim 36, wherein the first and second mechanical actuator positions define a plane that is substantially perpendicular to the substrate.

39. A microelectromechanical optical cross-connect switch according to claim 36, wherein the first and second mechanical actuator positions define a plane that is substantially parallel to the substrate.

40. A microelectromechanical optical cross-connect switch according to claim 36 further comprising:
a plurality of flexible elements, on the substrate, each of the plurality of flexible elements having a first portion attached to the substrate and a second portion, spaced-apart from the first portion, attached to one of the plurality of reflectors, wherein each of the plurality of flexible elements allows the attached one of the plurality of reflectors to move between the first and second reflector positions.

41. A microelectromechanical optical cross-connect switch according to claim 40, wherein each of the plurality of flexible elements includes a third portion spaced-apart from the first and second portions and attached to the substrate.

42. A microelectromechanical optical cross-connect switch according to claim 36 further comprising:
a plurality of flexible elements, on the substrate, each of the plurality of flexible elements having a first portion attached to the substrate and a second portion, spaced-apart from the first portion attached to one of the plurality of reflectors, wherein ones of the plurality of flexible elements attached to the selected ones of the plurality of reflectors move when the mechanical actuator moves from the first mechanical actuator position to the second mechanical actuator position and at least one of the plurality of flexible elements attached to the selected at least one of the plurality of reflectors holds the selected at least one of the plurality of reflectors in the first reflector position when the mechanical actuator moves from the first mechanical actuator position to the second mechanical actuator position.

43. A microelectromechanical optical cross-connect switch according to claim 42, wherein the ones of the plurality of flexible elements attached to the at least one of the plurality of reflectors are located outside the optical beam path when the at least one of the plurality of reflectors is moved to the second reflector position.

44. A microelectromechanical optical cross-connect switch according to claim 42, wherein the ones of the plurality of flexible elements attached to the at least one of the plurality of reflectors are located substantially outside the optical beam path when the at least one of the plurality of reflectors is moved to the second reflector position.

45. A microelectromechanical optical cross-connect switch according to claim 41 further comprising:
a plurality of second flexible elements, on the substrate, spaced-apart from the plurality of first flexible elements, each of the plurality of second flexible elements having a first portion attached to the substrate and a second portion, spaced-apart from the first portion, attached to one of the plurality of reflectors, wherein ones of the plurality of second flexible elements attached to the selected ones of the plurality of reflectors move when the mechanical actuator moves from the first mechanical actuator position to the second mechanical actuator position and at least one of the plurality of second flexible elements attached to the selected at least one of the plurality of reflectors holds the selected at least one of the plurality of reflectors in the first reflector position when the mechanical actuator moves from the first mechanical actuator position to the second mechanical actuator position.

46. A microelectromechanical optical cross-connect switch according to claim 45, wherein the ones of the plurality of second flexible elements attached to the at least one of the plurality of reflectors are located substantially outside the optical beam path when the at least one of the plurality of reflectors is moved to the second reflector position.

47. A microelectromechanical optical cross-connect switch according to claim 41, wherein at least one of the plurality of flexible elements comprises a u-shaped zig-zag flexible element.

48. A microelectromechanical optical cross-connect switch according to claim 41, wherein at least one of the plurality of flexible elements comprises a w-shaped zig-zag flexible element.

49. A microelectromechanical optical cross-connect switch according to claim 41, wherein at least one of the plurality of flexible elements extends in a direction substantially perpendicular to the substrate when the mechanical actuator moves from the first to the second mechanical actuator position.

50. A microelectromechanical optical cross-connect switch according to claim 41, wherein at least one of the plurality of flexible elements extends in a direction substantially parallel to the substrate when the mechanical actuator moves from the first to the second mechanical actuator position.

51. A microelectromechanical optical cross-connect switch according to claim 36, further comprising:
a plurality of trenches in the substrate opposite the plurality of reflectors.

52. A microelectromechanical optical cross-connect switch according to claim 40, further comprising:
a plurality of trenches in the substrate opposite the plurality of reflectors, wherein each of the plurality of flexible elements extends opposite the associated one of the plurality of trenches from the substrate to the associated one of plurality of reflectors.

53. A microelectromechanical optical cross-connect switch according to claim 36, wherein the mechanical actuator comprises a conductive plate that is moved between the first and second mechanical actuator positions via at least one of an inductively driven servo and a stepper motor least.

54. A microelectromechanical optical cross-connect switch according to claim 36, wherein the selector comprises a conductor that conducts a plurality of voltage levels to the selected ones of the plurality of reflectors to couple the selected ones of the plurality of reflectors to the mechanical actuator.

55. A method for switching optical energy from an input of a microelectromechanical optical cross-connect switch to an output thereof, the method comprising the steps of:

coupling at least one of a plurality of reflectors at respective first reflector positions to a mechanical actuator along an optical beam path from an associated input of the microelectromechanical optical cross-connect switch to an associated output thereof;

moving the mechanical actuator from a first mechanical actuator position to a second mechanical actuator position to move the at least one of the plurality of reflectors to respective second reflector positions outside the optical beam path; and decoupling at least one of the plurality of reflectors from the mechanical actuator in the first mechanical actuator position so that the at least one of the plurality of reflectors remains in the first reflector position along the optical beam path when the mechanical actuator moves from the first to the second mechanical actuator position.

56. A method according to claim 55, wherein the step of moving comprises the step of moving the mechanical actuator along a path substantially parallel to a substrate of the microelectromechanical optical cross-connect switch.

57. A method according to claim 55, wherein the step of moving comprises the step of moving the mechanical actuator along a path substantially perpendicular to a substrate of the microelectromechanical optical cross-connect switch.

58. A method for switching optical energy from an input of a microelectromechanical optical cross-connect switch to an output thereof, the method comprising the steps of:

coupling at least one of a plurality of reflectors at respective first reflector positions to a mechanical actuator along an optical beam path from an associated input of the microelectromechanical optical cross-connect switch to an associated output thereof;

moving the mechanical actuator from a first mechanical actuator position to a second mechanical actuator position to move the at least one of the plurality of reflectors to respective second reflector positions outside the optical beam path;

moving the mechanical actuator from the second to the first mechanical actuator position; and decoupling the coupled ones of the plurality of reflectors from the mechanical actuator in the first mechanical actuator position.

59. A method for switching optical energy from an input of a microelectromechanical optical cross-connect switch to an output thereof, the method comprising the steps of:

coupling at least one of a plurality of reflectors at respective first reflector positions to a mechanical actuator along an optical beam path from an associated input of the microelectromechanical optical cross-connect switch to an associated output thereof, moving the mechanical actuator from a first mechanical actuator position to a second mechanical actuator position to move the at least one of the plurality of reflectors to respective second reflector positions outside the optical beam path; and decoupling the coupled ones of the plurality of reflectors from the mechanical actuator in the second mechanical actuator position.

60. A method for switching optical energy from an input of a microelectromechanical optical cross-connect switch to an output thereof, the method comprising the steps of:

coupling at least one of a plurality of reflectors at respective first reflector positions to a mechanical actuator along an optical beam path from an associated input of the microelectromechanical optical cross-connect switch to an associated output thereof, and moving the mechanical actuator from a first mechanical actuator position to a second mechanical actuator position to move the at least one of the plurality of reflectors to respective second reflector positions outside the optical beam path, wherein the step of coupling comprises the step of applying a clamping voltage level to the ones of the plurality of reflectors to electrostatically couple the ones of the plurality of reflectors to the mechanical actuator.

61. A method for switching optical energy from an input of a microelectromechanical optical cross-connect switch to an output thereof, the method comprising the steps of:

coupling at least one of a plurality of reflectors at respective first reflector positions to a mechanical actuator along an optical beam path from an associated input of the microelectromechanical optical cross-connect switch to an associated output thereof; and moving the mechanical actuator from a first mechanical actuator position to a second mechanical actuator position to move the at least one of the plurality of reflectors to respective second reflector positions outside the optical beam path, wherein the step of moving comprises the steps of moving the mechanical actuator from the first to the second mechanical actuator position to contact ones of the plurality of reflectors to move the contacted ones of the plurality of reflectors from the first reflector position substantially perpendicular to the optical beam path to the second reflector position substantially parallel to the optical beam path and clamping ones of the plurality of reflectors in the second reflector position.

62. A method according to claim 61, further comprising the steps of:

moving the mechanical actuator from the second mechanical actuator position; and allowing selected ones of the plurality of reflectors to move from the second to the first reflector position.

63. A method according to claim 55, further comprising the step of:

transmitting optical energy from the input to the output along the optical beam path.

* * * * *